United States Patent [19]

Clingon et al.

[11] Patent Number: 4,914,313
[45] Date of Patent: Apr. 3, 1990

[54] POWER INTERRUPTION SYSTEM

[75] Inventors: Ricky A. Clingon, Rockford, Ill.; Doyle Clingon, 4612 Stenstrom Rd., Rockford, Ill. 61109; Russell L. Fewkes, Rockford, Ill.

[73] Assignee: Doyle Clingon, Rockford, Ill.

[21] Appl. No.: 215,231

[22] Filed: Jul. 5, 1988

[51] Int. Cl.$^4$ ................................................ H02J 1/00
[52] U.S. Cl. .................................... 307/10.1; 307/10.6
[58] Field of Search ............... 361/25, 103; 307/10 R, 307/10.1, 10.6, 117, 118; 340/52 F, 57, 449, 451, 459; 123/198 DC, 198 DB

[56] References Cited

U.S. PATENT DOCUMENTS

| | | | |
|---|---|---|---|
| 4,034,335 | 7/1977 | Harazoe et al. | 340/52 F |
| 4,074,672 | 2/1978 | LaDue et al. | 340/52 F X |
| 4,136,329 | 1/1979 | Trosert | 340/52 F |
| 4,534,214 | 8/1985 | Takahashi | 340/52 F X |
| 4,547,826 | 10/1985 | Premerlani | 361/103 |

Primary Examiner—Derek S. Jennings

[57] ABSTRACT

A power generating device requiring the transmission of power has a power interruption system. This system is continuously energized and has a power transmission network for the power generating device. The system has sensors for detecting a need to interrupt power transmission to the power generating device. A switching circuit, triggered by the sensors, energizes a switching device to interrupt the transmission of power to the power generating device.

19 Claims, 1 Drawing Sheet

POWER INTERRUPTION SYSTEM

BACKGROUND OF THE INVENTION

Automatic systems for shutting down internal combustion engines have typically responded when the engine's operating temperature exceeds safe engine performance limits. U.S. Pat. No. 4,074,672, "Shutoff Apparatus for Internal Combustion Engines", discloses such a shutdown system.

Shutdown systems are intended to be safety devices to protect their guarded engines. Some shutdown devices, however, create additional safety concerns by switching operating circuitry to ground. This action creates current surges and high circuit temperatures which may damage circuit elements.

The shutdown circuit in U.S. Pat. No. 4,074,672, is designed for use with ignition systems for spark-fired internal combustion engines. The circuit uses a sensor to detect when the engine is overheating. An overheated engine status switches the sensor and completes a path to ground for current normally flowing to the ignition coil for the engine. The grounded ignition coil no longer produces the needed voltage to fire the engine's spark plugs. The engine, therefore, shuts off.

The grounding circuit in U.S. Pat. No. 4,074,672, has the potential of creating current surges and high temperatures. These conditions may damage such components as an induction coil in an ignition system, solenoids in fuel valves for diesel engines, or windings on electrical motors. High temperatures during switching could also ignite flammable materials in the circuit's environment causing personal injury and equipment damage.

The above deficiencies in a grounding engine shutdown system are overcome by the invention. Instead of grounding ignition system components, the invention disconnects the circuit which energizes a power generating device. This act produces no excessive current or heat surges in the circuit.

The invention's operation may be generally applied to power generating and power transmitting devices. The invention senses a potentially device damaging condition, switches open the circuit energizing that power generating or power transmitting device, and safely turns off the device. Additionally, the invention provides diagnostic feedback to an operator to identify why the power generating or power transmitting device was automatically turned off.

DESCRIPTION OF THE PREFERRED EMBODIMENT

Figure 1:
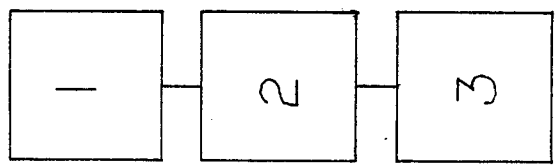
FIG. 1 is a block diagram showing a power source, power generating or power transmitting device, and the invention's power interruption system.

A power source 1 (FIG. 1) activates a power generating device 2, such as an internal combustion engine or diesel engine. A power interruption system 3, between the power source 1 and power generating device 2, functions as a safety device by sensing and responding to a need for interrupting the operation of the power generating device 2.

Figure 2:
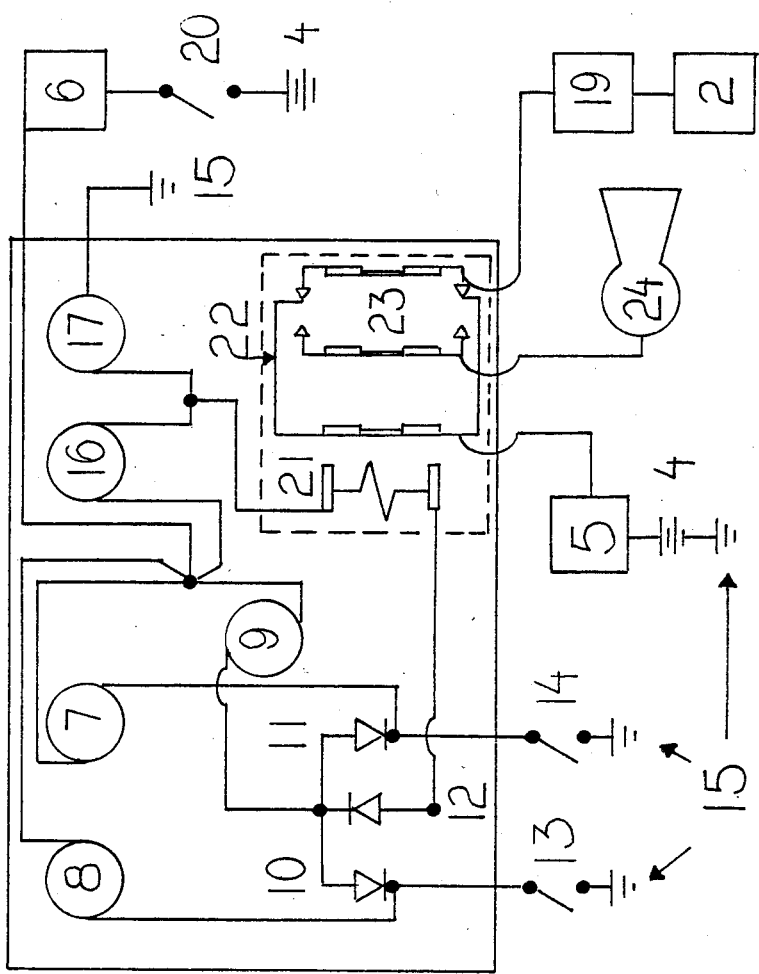
FIG. 2 is a circuit diagram of the invention's power interruption system.

The power interruption system 3 (FIG. 2) and power generating device 2 are energized by power source 1 (FIG. 1), typically a battery 4 (FIG. 2) and an ignition system 5. A fuse 6 limits the quantity of electrical power delivered to the power interruption system 3 and the power generating device 2.

Electrical power branches to water temperature indicator light 7 and oil pressure indicator light 8 and warning horn 9, then to the reverse current flow ends of water temperature diode 10, oil pressure diode 11, and relay diode 12. Electrical current will not flow through diodes 10, 11, 12 until the normally open water temperature sensor 13 or oil pressure sensor 14 closes to complete a circuit from battery 4 to ground 15. Water temperature sensor 13 may be designed to close when the sensed temperature rises to a predetermined level which threatens the safe operation of power generating device 2. Similarly, oil pressure sensor 14 may be designed to close when the sensed oil pressure falls below a predetermined level which threatens the safe operation of power generating device 2.

Electrical current from fuse 6 also branches to a normally closed, momentary override switch 16, then to the system armed indicator light 17 and relay 18. The system armed indicator light 17 will illuminate when the power interruption system 3 is on because of the path from battery 4 to ground 15 through the system armed indicator light 17 and the normally closed, momentary override switch 16.

Electrical current flows through relay 18 to the forward current flow and of warning horn diode 11. Relay 18 will energize and interrupt operation of power generating device 2 when water temperature sensor 13 or oil pressure sensor 14 closes to complete a path to ground through diodes 10, 11, or 12.

Electrical current flows from battery 4 through ignition system 5, the normally closed portion of relay 18, energy transmission component 19, and into power generating device 2. Energy transmission component 19 may be an ignition coil, fuel valve, or unnecessary when the power generating device 2 is respectively an internal combustion engine or diesel engine.

The normally closed portion of relay 18 allows power generating device 2 to operate if power interruption system 3 is turned off because of a broken fuse 6 or manual switch 20 in the off position. This manual switch 20 allows optional operation of the power interruption system 3.

POWER INTERRUPTION OPERATION

The power interruption system 3 turns off power generating device 2 by energizing relay 18.

If water temperature sensor 13 closes because of excessively high water temperature, a completed circuit to ground occurs. Electrical current flows from battery 4 through water temperature indicator light 8 and water temperature sensor 13 to ground 15. Similarly, electrical current flows from battery 4 through warning horn 9, water temperature diode 10, and water temperature sensor 13 to ground 15. Similarly, electrical current flows from battery 4 through override switch 16, relay 18, relay diode 12, water temperature diode 10, and water temperature sensor 13 to ground 15. This completed current flow through relay 18 energizes relay electromagnet 21, pulls moveable relay throw 22 away from the contacts 23 leading to energy transmission component 19 and turns off power generating device 2.

The closing of water temperature sensor 13 will not illuminate oil pressure indicator light 7 because no path to ground 15 is completed through oil pressure sensor 14. If oil pressure sensor 14 closes because of excessively low oil pressure, the power interruption system 3 would illuminate the oil pressure indicator light 7, not the water temperature indicator light 8. The balance of the power interruption system 3 reacts as described when the water temperature sensor 13 closes.

Override switch 16 is included in the power interruption system 3 for emergency operation of power generating device 2. An operator may hold open override switch 16 so no current flows through relay 18 eventhough water temperature sensor 13 or oil pressure sensor 14 is closed. Consequently, relay electromagmet 21 would not be energized and current would flow through relay throw 22, contacts 23, energy transmission componet 19, and power generating device 2. An example of such an emergency use would be to keep an engine running long enough to move the engine driven vehicle out of traffic and onto a road shoulder.

The power interruption system 3 may include a delay device which maintains current flow through relay 18 for a predetermined time after water temperature sensor 13 or oil pressure sensor 14 closes. This optional delay feature gives a vehicle operator time to move the vehicle out of traffic and onto a road shoulder. Additionally, the vehicle's standard horn may be used as a second warning horn 24 so the movement of relay throw 22 directs current flow to the second warning horn 24. Likewise, multiple sensors for various vehicle functions, such as transmission and power train operation, could be added to the power interruption system. These would expand the diagnostic and power generating device shutdown capability of the system.

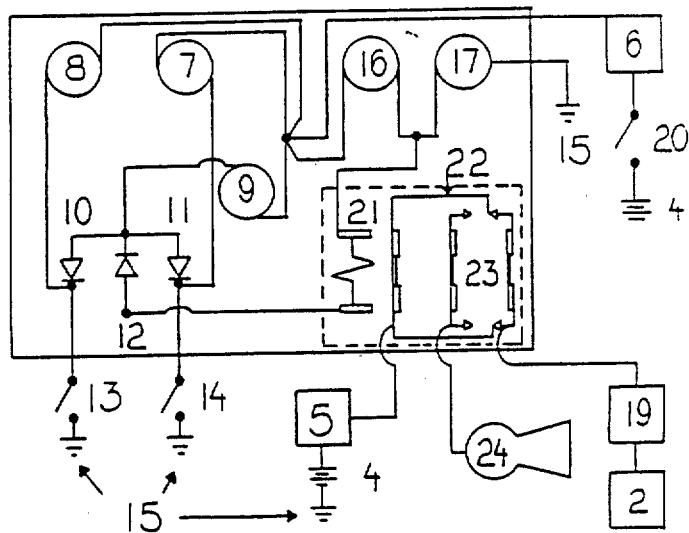

We claim:

1. An analog power interruption system for automatically turning off power transmission, the power interruption system comprising:
   a power generating device;
   means for energizing the power interruption system;
   an electrically activated energy transmission component for transmitting energy to the power generating device;
   means for sensing a need to turn off the power generating device;
   means for disconnecting electrical power from the energy transmission component, without grounding the energy transmission component, to inactivate the energy transmission component and turn off the power generating device in response to the means for sensing, wherein the energy transmission component is an induction coil or solenoid actuated fuel valve.

2. The power interruption system of claim 3, wherein the electrically activated energy transmission component comprises an electrical ignition coil for generating the required electrical energy to energize the
   internal combustion engine.

3. The power interruption system of claim 1, wherein the power generating device is an internal combustion engine.

4. The power interruption system of claim 5, wherein the electrically activated energy transmission component comprises:
   an electrically responsive solenoid; and
   a solenoid actuated fuel valve for delivering and stopping fuel flow to the diesel engine.

5. The power interruption system of claim 1, wherein the power generating device is a diesel engine.

6. The power interruption system of claim 1, wherein the power generating device is an electrical motor.

7. The power interruption system of claim 1, wherein the means for sensing a need to turn off the power generating device comprises sensors calibrated to transmit electrical energy when conditions exist which threaten the continued operation of the power generating device.

8. The power interruption system of claim 7, wherein the sensors include:
   a pressure sensor to detect oil pressure in the power generating device;
   a temperature sensor to detect the internal temperature of the power generating device;
   indicator lights corresponding to the pressure sensor and the temperature sensor and responsive to the activation of the pressure sensor and the temperature sensor; and
   an audible alarm activated by the pressure sensor and the temperature sensor.

9. The power interruption system of claim 1, wherein the means for disconnecting electrical power from the energy transmission component comprises:
   an electrical relay; and
   an electrical network allowing the selective transmission of electrical energy from a single means for sensing to energize the electrical relay.

10. The power interruption system of claim 9, wherein the electrical network comprises diodes.

11. The power interruption system of claim 9, wherein the electrical network includes means for bypassing the means for sensing to continue the flow of electrical power to the energy transmission component so no interruption of the power generating device occurs.

12. The invention power interruption system of claim 11, wherein the means for bypassing the means for sensing comprises a momentary, normally closed switch.

13. An analog method of interrupting power transmission to a power generating device, said method comprising:
   energizing a power interruption electrical circuit;
   electrically activating an energy transmission component to energize the power generating device;
   sensing a need to turn off the power generating device; and
   disconnecting electrical power from the energy transmission component, without grounding the energy transmission component, to turn off the power generating device in response to the need to turn off the power generating device, wherein the energy transmission component is an induction coil or a solenoid actuated fuel valve.

14. The method of claim 13, wherein electrically activating an energy transmission component comprises transmitting electricity from an energy source through an electrical ignition coil to energize an internal combustion engine.

15. The method of claim 13, wherein
   electrically activating an energy transmission component comprises transmitting electricity from an energy source to an electrically responsive solenoid to open a fuel valve for energizing a diesel engine.

16. The method of claim 13, wherein sensing a need to turn off the power generating device comprises the closing of normally open switches when conditions exist which threaten the continued operation of the power generating device.

17. The method of claim 16, wherein sensing a need to turn off the power generating device includes illuminating an indicator light corresponding to the closed switch and energizing an audible alarm.

18. The method of claim 13, wherein disconnecting electrical power from the energy transmission component comprises energizing a relay to disconnect power from an electrical ignition coil and thereby turn off an internal combustion engine when sensed conditions threaten the continued operation of the power generating device.

19. The method of claim 13, wherein disconnecting electrical power from the energy transmission component comprises energizing a relay to disconnect electrical power from an electrically responsive solenoid, close a solenoid actuated fuel valve and thereby turn off a diesel engine.

* * * * *

UNITED STATES PATENT AND TRADEMARK OFFICE
CERTIFICATE OF CORRECTION

PATENT NO. : 4,914,313

DATED : Apr. 3, 1990

INVENTOR(S) : Ricky A. Clingon, et al.

It is certified that error appears in the above-identified patent and that said Letters Patent is hereby corrected as shown below:

The title page should be deleted to appear as per attached title page.

Signed and Sealed this

Twenty-fifth Day of December, 1990

Attest:

HARRY F. MANBECK, JR.

*Attesting Officer*     *Commissioner of Patents and Trademarks*

United States Patent [19]

Clingon et al.

[11] Patent Number: 4,914,313
[45] Date of Patent: Apr. 3, 1990

[54] POWER INTERRUPTION SYSTEM

[75] Inventors: Ricky A. Clingon, Rockford, Ill.;
Doyle Clingon, 4612 Stenstrom Rd.,
Rockford, Ill. 61109; Russell L.
Fewkes, Rockford, Ill.

[73] Assignee: Doyle Clingon, Rockford, Ill.

[21] Appl. No.: 215,231

[22] Filed: Jul. 5, 1988

[51] Int. Cl.$^4$ ............................................. H02J 1/00
[52] U.S. Cl. ................................. 307/10.1; 307/10.6
[58] Field of Search ............... 361/25, 103; 307/10 R,
307/10.1, 10.6, 117, 118; 340/52 F, 57, 449,
451, 459; 123/198 DC, 198 DB

[56] References Cited
U.S. PATENT DOCUMENTS

| | | | |
|---|---|---|---|
| 4,034,335 | 7/1977 | Harazoe et al. | 340/52 F |
| 4,074,672 | 2/1978 | LaDue et al. | 340/52 F X |
| 4,136,329 | 1/1979 | Trosert | 340/52 F |
| 4,534,214 | 8/1985 | Takahashi | 340/52 F X |
| 4,547,826 | 10/1985 | Premerlani | 361/103 |

*Primary Examiner*—Derek S. Jennings
*Attorney, Agent or Firm*—Kenneth J. Cooper

[57] ABSTRACT

A power generating device requiring the transmission of power has a power interruption system. This system is continuously energized and has a power transmission network for the power generating device. The system has sensors for detecting a need to interrupt power transmission to the power generating device. A switching circuit, triggered by the sensors, energizes a switching device to interrupt the transmission of power to the power generating device.

19 Claims, 1 Drawing Sheet